INVENTORS
D.L. PETERS
D.L. ALEXANDER
BY Hudson and Young
ATTORNEYS

May 31, 1966  D. L. PETERS ET AL  3,253,302
NOZZLE FOR INJECTION MOLDING MACHINE
Filed Dec. 8, 1960  3 Sheets-Sheet 2

INVENTORS
D.L. PETERS
D.L. ALEXANDER
BY Hudson and Young
ATTORNEYS

INVENTORS
D.L. PETERS
D.L. ALEXANDER
BY Hudson and Young
ATTORNEYS

United States Patent Office 3,253,302
Patented May 31, 1966

3,253,302
NOZZLE FOR INJECTION MOLDING MACHINE
Donald L. Peters and Doyle L. Alexander, Bartlesville, Okla., assignors to Phillips Petroleum Company, a corporation of Delaware
Filed Dec. 8, 1960, Ser. No. 74,695
6 Claims. (Cl. 18—30)

This invention relates to the injection molding of thermoplastic materials. In one aspect it relates to an apparatus for plasticizing thermoplastic materials in the manufacture of molded articles. In another aspect it relates to a means for adding heat to a thermoplastic material which is being plasticized in an injection molding machine.

Conventional molding apparatus of the injection type usually include an injection or heating cylinder having associated therewith an injection plunger or piston. The injection plunger reciprocates in the bore of the heating cylinder in such a manner as to allow the solid thermoplastic material to be molded to enter the cylinder on the withdrawal stroke of the plunger. On the compression stroke of the plunger, the thermoplastic material, now substantially in a molten stae, is forced from the injection cylinder through a nozzle and thence through runners or passages and sprues into the cavity or cavities of the mold. Heating thermoplastic materials for injection molding presents problems resulting from the non-heat conductive nature of most thermoplastic materials and the tendency of such thermoplastic materials to decompose or scorch if subjected to temperatures substantially above their softening or plasticizing temperature.

It is, therefore, a principal object of this invention to provide an improved means for adding heat to and for plasticizing thermoplastic materials in an injection molding machine. A further object is to provide an apparatus for use in the heating cylinder, or in an extension of the heating cylinder, of an injection molding machine to divert the flow of unplasticized material to a point or points where heat can be added to the unplasticized material. Still another object of this invention is to provide a device for plasticizing unplasticized thermoplastic material in an injection molding machine by subjecting the unplasticized material to increasing frictional contact with the device so as to impart plasticizing heat thereto. Other objects and advantages will be apparent to one skilled in the art upon studying the present disclosure including the detailed description of the invention and the drawing wherein:

Broadly, our invention resides in an improvement obtained in plasticizing the material in the heating cylinder, or a nozzle body which comprises an extension of the heating cylinder, by causing unplasticized or highly viscous material to be diverted toward the heated walls of the heating cylinder and/or be restrained at the openings through the breaker plate to remain in contact with this source of heat until it is plasticized sufficiently to flow through the openings of the breaker plate or strainer positioned in the heating cylinder. We have provided a cylinder or cup-shaped breaker plate or strainer having a closed end toward the inlet end of the heating cylinder and an open end toward the nozzle tip or outlet end of the heating cylinder. The closed end of the strainer contains a plurality of passageways of decreasing cross-sectional area in the direction of flow of plasticized material so that the plasticized material readily passes therethrough and the unplasticized or highly viscous material is diverted toward the heated walls of the nozzle or heating cylinder. The strainer has a plurality of longitudinal grooves around its periphery and there is a plurality of passageways in each of the grooves through the sides of the strainer to its interior. These passageways are substantially normal to the flow of plasticized material through the nozzle or heating cylinder and are of decreasing cross-sectional area from the outside of the strainer to the inside of the strainer.

Figure 1:
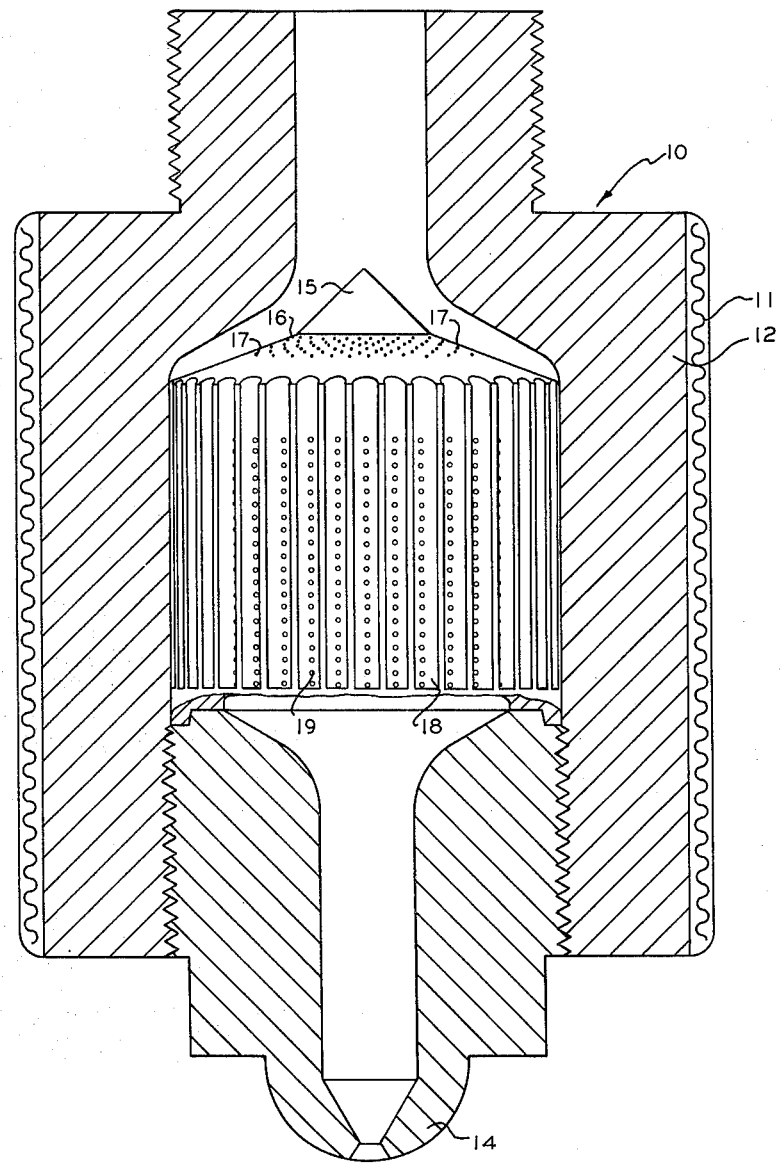
FIGURE 1 is a view, partly in section and partly in elevation, of the injection molding apparatus of this invention.

Referring now to the drawing, and particularly to FIGURE 1, the injection molding nozzle or heating cylinder indicated at 10 includes an external heating element 11 surrounding cylinder 12. Molten thermoplastic material passes through the cylinder 12 and out through the nozzle tip 14. The strainer or breaker plate 15 has a conical closed end 16 containing a plurality of passageways therethrough indicated at 17. A plurality of grooves 18 around the periphery of the strainer 15 each has a plurality of passageways 19 extending through the walls of the strainer 15 to the interior thereof. The closed end can be substantially conical as shown or can be flat, that is, normal to the longitudinal axis of the cylinder.

Figure 2:
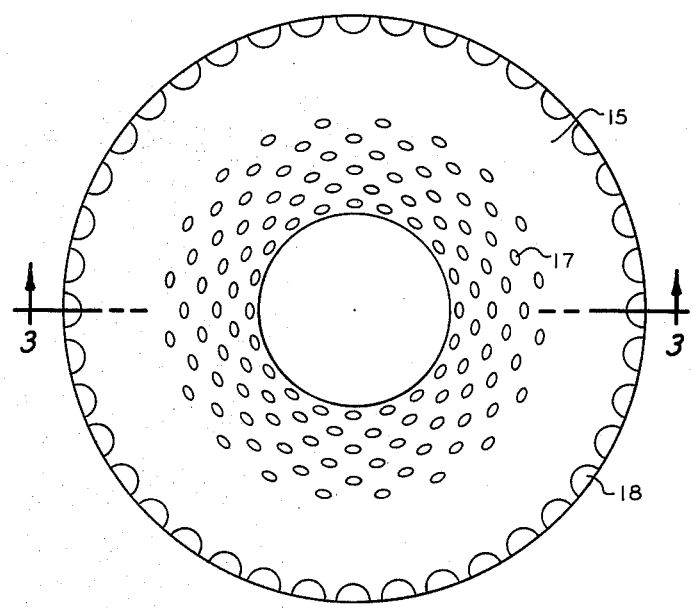
FIGURE 2 is a plane view of the breaker plate or strainer of this invention.

FIGURE 2 shows the disposition of the passageways 17 in the closed end of the strainer 15 and the disposition of the grooves 18 around the periphery of the strainer.

Figure 4:
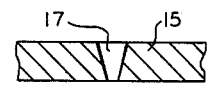
FIGURE 4 is a section of the breaker plate of FIGURE 3 showing a modification of the passageways therein.
Figure 5:
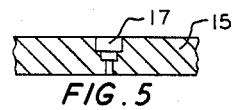
FIGURE 5 is a further modification of the passageways of the breaker plate.
Figure 3:
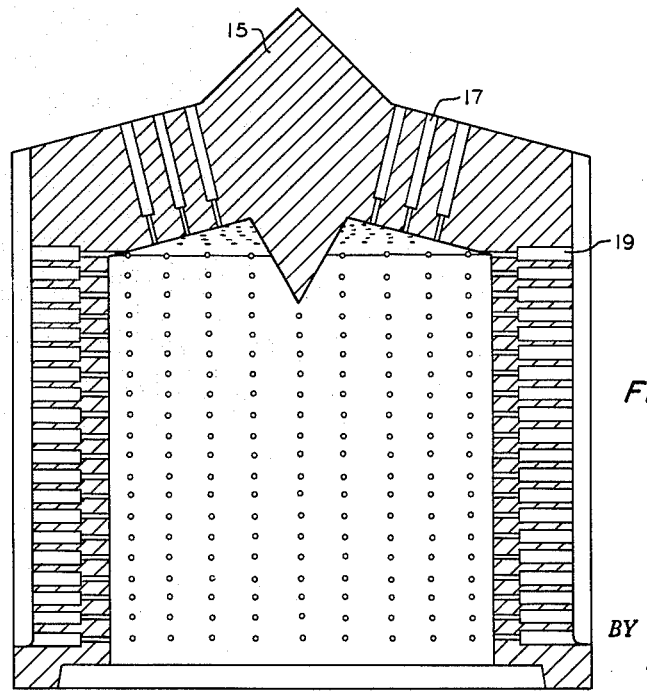
FIGURE 3 is a section of the breaker plate of FIGURE 2 taken along lines 3—3.

FIGURE 3 shows the disposition of the passageways 17 and 19 through the closed end and walls of the strainer 15. The passageways 19 are illustrated as comprising two lengths of decreasing cross-sectional area. FIGURE 4 shows a modification of the passageways 17 or 19 as frustoconical openings throughout the walls of the strainer 15. FIGURE 5 shows another modification of the passageways 17 or 19 wherein each passageway comprises three lengths of decreasing cross-sectional area.

Figure 6:
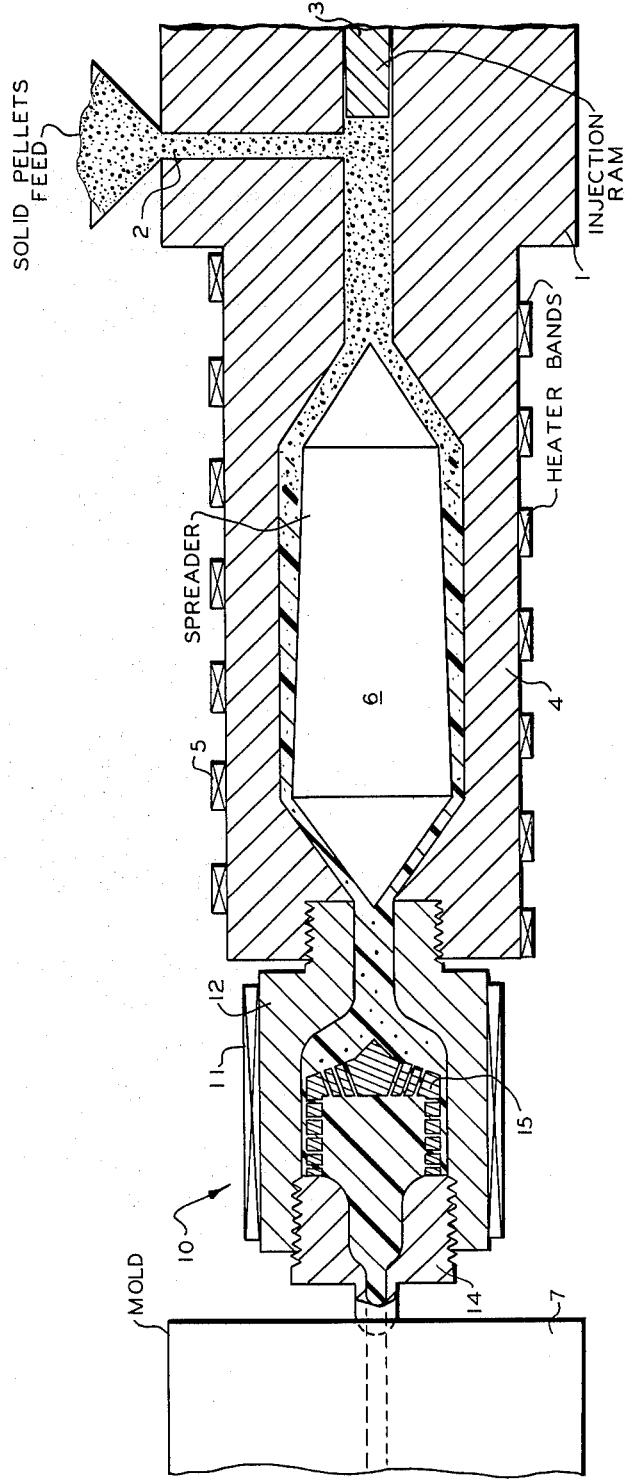
FIGURE 6 is a sectional view of the breaker plate positioned in an extrusion apparatus.

FIGURE 6 shows the molding or plasticizing nozzle 10 positioned in a conventional or standard injection apparatus comprising a barrel 1 having a feed port 2, an injection ram 3, and a heating cylinder 4. Heating bands 5 and 11 add heat to the heating cylinder 4 and the nozzle cylinder or body 12. Spreader 6 diverts flow of molten plastic and unmelted pellets toward the heated wall and offers resistance to flow so as to increase frictional forces within the material being plasticized. The partly plasticized material passes through the breaker plate 15, where it is completely plasticized, and then through nozzle tip 14 into mold 7.

The nozzle of the invention has been successfully used in the injection molding of high molecular weight linear polyethylene at faster rates than had been possible with prior art injection nozzles and with substantially complete freedom from blocking of the passageways by unplasticized polyethylene. The faster molding rates result from a reduction in pressure drop and a more uniform heating of the thermoplastic material utilizing the cylindrical breaker plate of this invention. If the production rates of the prior art nozzles are maintained, a drastic reduction in power and heating requirements is realized.

Injection molding runs were made using the nozzle of our invention on a Fellows injection molding machine, Type 1B–3–15. The material molded was low pressure, high density polyethylene. It was possible to more than double the production rate and to reduce the cylinder temperature from about 600° F. to about 425° F. for molding thin walled articles and to about 350° F. for thick walled articles. In another run a nozzle with a flat breaker plate having a plurality of passageways therethrough of decreasing cross-sectional area operated at an increase in capacity of from 9 pounds per hour using no plate to 44 pounds per hour using the flat plate and the capacity was increased to about 50 pounds per hour using the cylindrical breaker plate of our invention. The pressure drop through the nozzle with the flat breaker plate was about 7½ percent and through the nozzle using our cylindrical breaker plate was about 4½ percent.

The nozzle used in the runs reported above was similar to that shown in the drawing having a 5/16-inch thick closed end and 5/8-inch thick side walls. The passageways through the closed end and side walls of the breaker plate were 80 mils in diameter on the outside of the cylinder and were 30 mils in diameter on the inside of the cylinder.

The cylindrical or cup-shaped breaker plate or strainer of this invention passes the plasticized material directly through the closed end of the breaker plate and diverts the unplasticized material toward the heated walls of the nozzle where plasticizing is facilitated. The cylindrical configuration of the breaker plate presents a greater area to the flowing plastic and therefore permits a greater number of plasticizing passageways therethrough which enables a faster flow rate of plastic at a reduced pressure drop value.

That which is claimed is:

1. An injection molding apparatus comprising a heated nozzle body having an opening therethrough, for passage of molten thermoplastic material; an inlet at one end of said opening and an outlet at the other end of said opening; a hollow, cylindrical breaker plate having a closed end and an open end positioned in, and substantially occupying the cross-sectional area of said opening with the closed end toward said inlet; a plurality of passageways through the closed end of said breaker plate substantially parallel with the direction of flow from said inlet to said outlet; a plurality of grooves around the periphery of said breaker plate parallel with the direction of flow from said inlet to said outlet extending from the closed end of the breaker plate to a point short of and adjacent the open end of the breaker plate; and a plurality of passageways through the periphery of said breaker plate in said grooves normal to the direction of flow from said inlet to said outlet.

2. An injection molding apparatus comprising a nozzle body having a cylindrical opening therethrough; a nozzle tip attached to one end of said opening; means attached to the other end of said opening to force molten thermoplastic material through said opening and said nozzle tip; means to heat said nozzle body; a breaker plate comprising a hollow cylinder with one closed end substantially occupying the cross-sectional area of said opening with the open end toward said nozzle tip; a plurality of passageways through the closed end of said breaker plate substantially parallel with the longitudinal axis of said breaker plate and decreasing in cross-sectional area in the direction of said nozzle tip; a plurality of longitudinal grooves around the periphery of said breaker plate extending from the closed end of the breaker plate to a point short of and adjacent the open end of the breaker plate; and a plurality of passageways extending through the breaker plate wall from the bottoms of the grooves, said passageways decreasing in cross-sectional area in the direction of the center of the cylindrical breaker plate.

3. The apparatus of claim 2 wherein the passageways comprise a plurality of lengths of decreasing diameter.

4. The apparatus of claim 2 wherein the passageways are frusto conical.

5. An apparatus comprising a heated cylinder through which molten thermoplastic material is forced; a hollow, cylindrical strainer having one end open and one end closed by a substantially conical end piece, positioned in said heated cylinder with the open end downstream with respect to the flow of thermoplastic material; a plurality of passageways of decreasing cross-sectional area in the direction of flow of material through said end piece substantially parallel with said cylinder; a plurality of longitudinal grooves around the outside of said strainer; said grooves having blind ends at the open end of said strainer and a plurality of passageways of decreasing cross-sectional area extending from the bottoms of said grooves to the interior of said cylinder.

6. A plasticizing head for heating plastic molding material comprising a hollow cylindrical housing having a longitudinally disposed heating chamber therein; said housing having an inlet end and a discharge end; a spreader element disposed longitudinally within and interfitting said heating chamber; said spreader element having an axially disposed body portion and outwardly radiating fins disposed longitudinally along that part of said body portion toward the inlet end; grooves between said fins being open toward said inlet end and terminating before reaching said discharge end; said body portion having a longitudinally and axially projecting tail extension adjacent the inlet end of said chamber; said body portion having longitudinal passage means therethrough and restrictive passage means opening between said fins communicating with said longitudinal passage means.

References Cited by the Examiner

UNITED STATES PATENTS

| | | | |
|---|---|---|---|
| 1,912,374 | 6/1933 | Johnson | 18—12 |
| 2,488,595 | 11/1949 | Henning | 18—12 |
| 2,500,401 | 3/1950 | Cossette | 18—30 |
| 2,680,880 | 6/1954 | Corbett | 18—30 |
| 2,740,986 | 4/1956 | Lipscomb | 18—12 |
| 2,860,375 | 11/1958 | Maccaferri | 18—30 |
| 2,895,167 | 7/1959 | Paggi | 18—30 |
| 2,962,759 | 12/1960 | Maccaferri | 18—30 |
| 2,990,576 | 7/1961 | Van Riper | 18—12 |
| 2,999,274 | 9/1961 | Silas et al. | 18—12 |

J, SPENCER OVERHOLSER, *Primary Examiner.*

WILLIAM J. STEPHENSON, ROBERT F. WHITE, MICHAEL V. BRINDISI, *Examiners*

M. YUDKOFF, T. F. SHANAHAN, W. L. McBAY,
*Assistant Examiners.*